United States Patent [19]

Halling

[11] Patent Number: 5,027,333

[45] Date of Patent: Jun. 25, 1991

[54] ACOUSTIC LOCATOR FOR ELEMENTS OF A FLEXIBLE SONAR ARRAY

[75] Inventor: Michael A. Halling, San Diego, Calif.

[73] Assignee: The United States of America as represented by the Secretary of the Navy, Washington, D.C.

[21] Appl. No.: 97,586

[22] Filed: Nov. 26, 1979

[51] Int. Cl.$^5$ .............................................. H04B 11/00
[52] U.S. Cl. ..................................... 367/131; 367/5; 367/130; 367/153
[58] Field of Search ................. 367/3, 5, 19, 130, 154, 367/153, 173, 106, 131, 155, 156

[56] References Cited

U.S. PATENT DOCUMENTS

| | | | |
|---|---|---|---|
| 3,019,412 | 1/1962 | Crawford | 367/173 |
| 3,783,441 | 1/1974 | Slawsky | 367/5 |
| 4,037,189 | 7/1977 | Bell et al. | 367/130 |
| 4,114,135 | 9/1978 | Funk | 367/3 |

Primary Examiner—Daniel T. Pihulic
Attorney, Agent, or Firm—Harvey Fendelman; Thomas Glenn Keough; John Stan

[57] ABSTRACT

An acoustic array, useful for sonar, comprises a plurality of transducing elements which are free floating and not connected to each other. Means are provided for locating the position of each of the transducer elements. The acoustic array may be one-dimensional, that is, a line array, a two-dimensional array, or a three-dimensional array. In another embodiment of the acoustic array, the transducing elements are free-floating but connected to each other by a flexible tether, which limits the range of separation of one transducing element from any of the others. The locator comprises a centrally located element to which there are attached three horizontal rigid arms. On the end of each arm is a high-frequency acoustic transducer. Periodically, each of the transducers transmits a high-frequency broadband pulse. The pulse from each of the three transducers is unique and identifiable. The rigid structure also contains a magnetic compass sensor which indicates the orientation of the rigid structure in the horizontal plane.

9 Claims, 3 Drawing Sheets

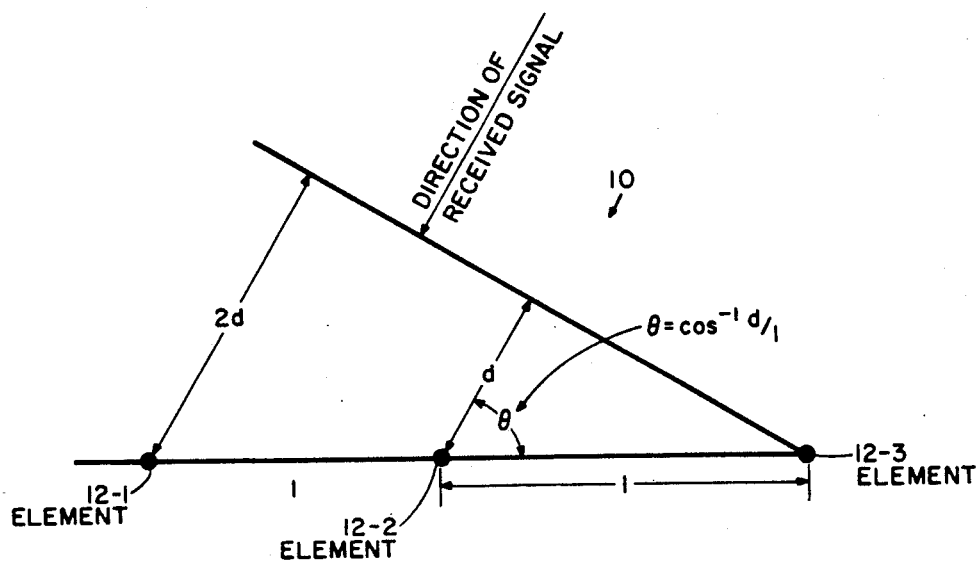
FIG. 1 GEOMETRY OF THREE-ELEMENT ARRAY
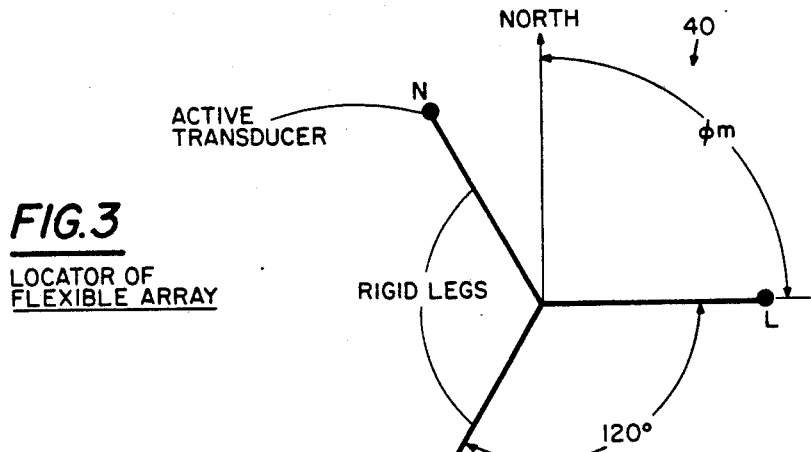
FIG. 3
LOCATOR OF
FLEXIBLE ARRAY
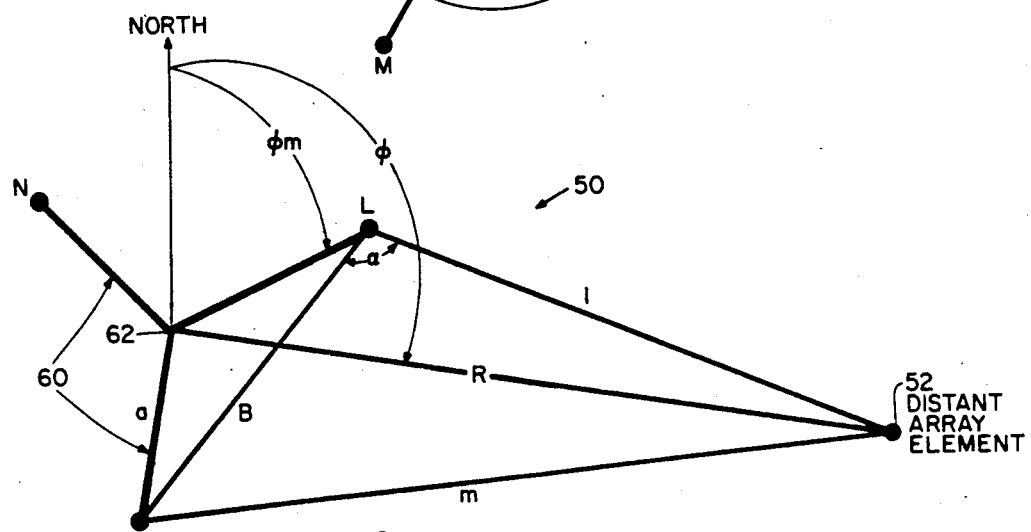
FIG. 4 GEOMETRICAL RELATIONSHIPS OF LOCATOR AND ONE ELEMENT

PLANAR SONAR ARRAY WITH ELEMENTS CONNECTED TO FLEXIBLE, FREE-FLOATING BODY

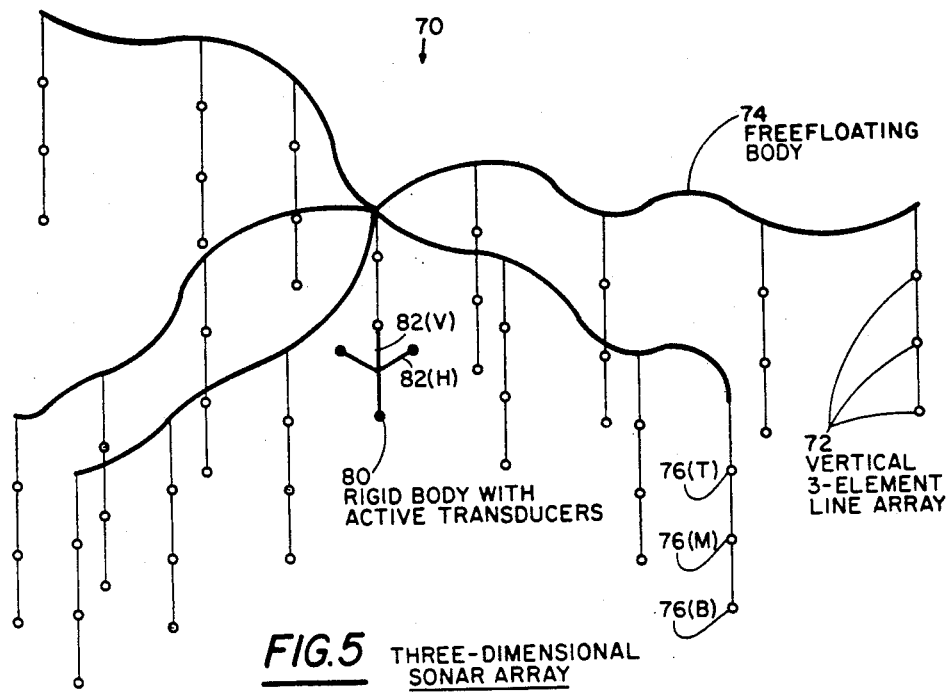
FIG.5 THREE-DIMENSIONAL SONAR ARRAY
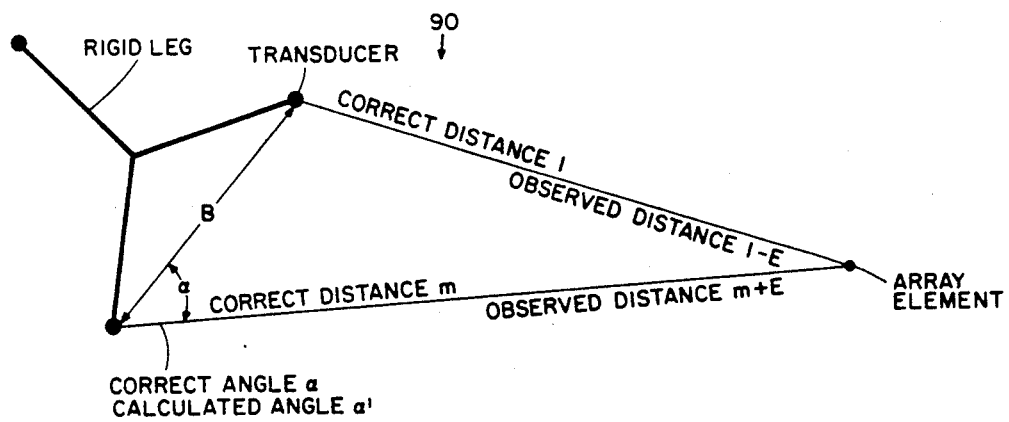
FIG.6 ANGLE ERROR CALCULATION

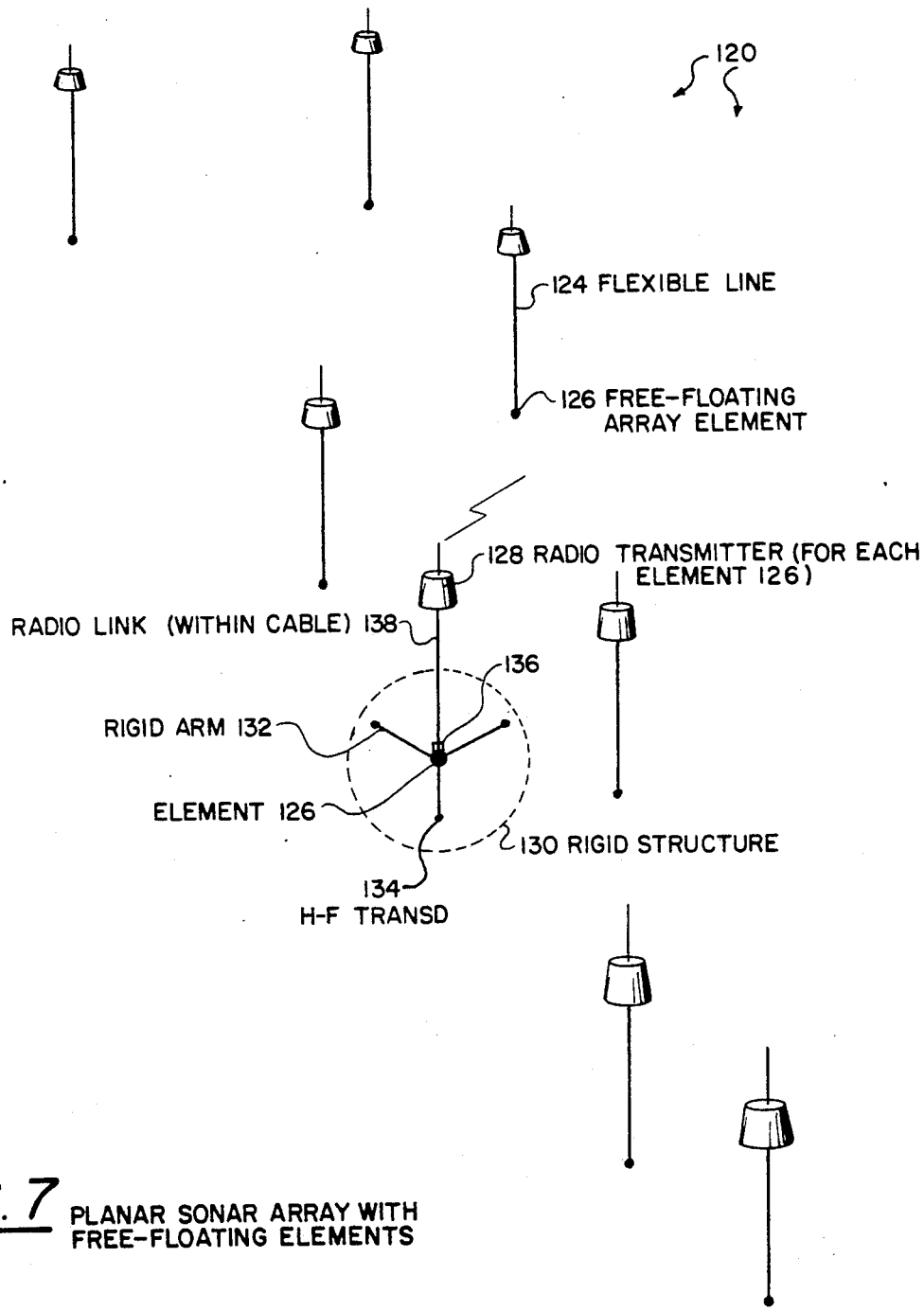
FIG. 7 PLANAR SONAR ARRAY WITH FREE-FLOATING ELEMENTS

ACOUSTIC LOCATOR FOR ELEMENTS OF A FLEXIBLE SONAR ARRAY

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention comprises an array which includes a small rigid body containing three active acoustic transducers. When employed in conjunction with existing signal detection and processing equipment, it will find the relative positions of the receiving elements. Of a large flexible acoustic array of arbitrary and changing shape. Thus a large two-or three-dimensional acoustic array may be fabricated, beamformed and processed without employing the usual large rigid structure.

Large low-frequency sonar arrays are widely used by the U.S. Navy. Beamforming and noise rejection by the array is achieved by several methods, but all methods depend on knowledge of the relative location of elements in the array.

FIG. 1 shows a 3-element line array 10. Let $T_d$=the time required for sound to travel a distance d in the medium. If the output of element 12-3 is delayed by a time equal to $2T_d$ and if the output of element 12-2 is delayed by a time $T_d$, and if both are then added to the output of element 12-1, then the resulting summed signal will emphasize signals coming from a direction $\pm\theta$, where $\theta=$ arc cos d/l. It will tend to reject sound (noise) coming from other directions.

Large flexible line arrays may be towed or otherwise put in tension, and the relative location of the elements may be assumed from the tensioning devices. However, large 2-and 3-dimensional arrays are preferred over line arrays because of their improved performance and noise rejection over line arrays.

The prior art method of constructing 2-and 3-dimensional arrays was to fabricate a rigid or semi-rigid structure with a known position for each element of the array. The disadvantages of this method are the weight and cost of the rigid structure, the propagation of sound in the rigid structure which reduces the performance of the array, and the production of sound by the rigid structure (flow noise about the structure, creaking and squeaking of a portable or floating rigid structure).

SUMMARY OF THE INVENTION

An acoustic array, useful for sonar, comprises a plurality of transducing elements which are free floating and not connected to each other. Means are provided for locating the position of each of the transducer elements. The acoustic array may be one-dimensional, that is, a line array, a two-dimensional array, or a three-dimensional array. In another embodiment of the acoustic array, the transducing elements are free-floating but connected to each other by a flexible tether, which limits the range of separation of one transducing element from any of the others. The locator comprises a centrally located element to which there is attached three horizontal rigid arms. On the end of each arm is a high-frequency acoustic transducer. Periodically, each of the transducers transmits a high-frequency broadband pulse. The pulse from each of the three transducers is unique and identifiable. The rigid structure also contains a magnetic compass sensor which indicates the orientation of the rigid structure in the horizontal plane.

OBJECTS OF THE INVENTION

An object of the invention is to provide a sonar array wherein the various transducer elements are not rigidly connected to each other.

Another object of the invention is to provide a sonar array wherein the transducer element are free-floating and can move in an unrestrained manner with respect to each other.

Yet another object of the invention is to provide a sonar array utilizing a submerged locator which permits determining the relative locations of all the transducer elements.

These and other objects of the invention will become more readily apparent from the ensuing specification when taken together with the drawings.

BRIEF DESCRIPTION OF THE DRAWINGS

FIG. 1 is a sketch showing the geometry of a three-element array.

FIG. 3 is a diagram showing the locator of the flexible array.

FIG. 4 is a sketch showing the geometrical relationships of the locator and one of the transducer elements.

FIG. 5 is a diagrammatic view of a three-dimensional sonar array wherein the movement of the transducer elements is constrained by a free-floating tether.

FIG. 6 is a diagram for computing the angle error between an array element and two of the high-frequency acoustic transducers of the locator structure.

FIG. 7 is a sketch of a planar sonar array wherein the elements are free floating.

DESCRIPTION OF THE PREFERRED EMBODIMENTS

Figure 2:
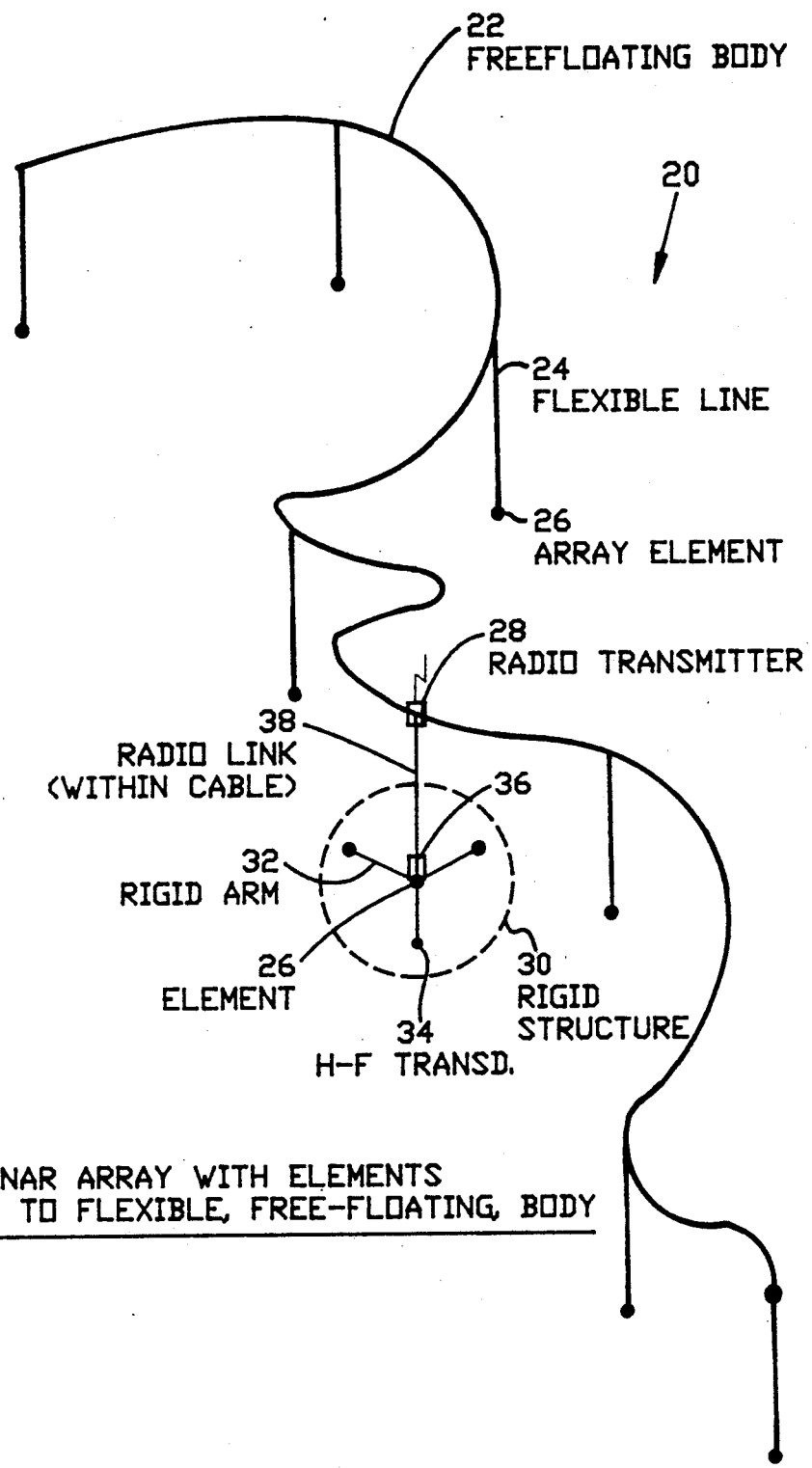
FIG. 2 is a simplified sketch of a planar sonar arrsy with the elements connected to a flexible, free-floating body.

It is not necessary to position the elements of an array in any unique fashion; it is only necessary to know the relative positions of the elements. That is, an irregular array will function approximately as well as a perfectly formed array so long as it is known where each element of the array is. It is only necessary to take account of the true location of each element when introducing appropriate time delays into the individual element outputs in order to do beamforming. Thus, a flexible floating array may be built at low cost and weight if there is a provision for finding the location of the various array elements.

Reference is now directed to the planar sonar array 20 shown in FIG. 2, comprising a free-floating flexible body 22, for example an air-inflated plastic tube. A plurality of flexible and compliant lines 24 suspend from their ends array elements 26. The result is an arbitrarily shaped horizontal planar array 20 of many elements 26 suspended below the surface of the ocean.

On one of the centrally located elements 26, is a small structure 30 having three horizontal rigid arms 32. On the end of each arm 32 is a high-frequency acoustic transducer 34. Periodically, each of the transducers 34 transmits a high-frequency broadband pulse. Typically, the pulses may be transmitted at about 300 kHz, with a 30-kHz bandwidth, at 5-second intervals. The pulse from each of the three transducers 34 is unique and identifiable.

The rigid structure 30 also contains a magnetic compass sensor 36 which indicates the orientation of the rigid structure in a horizontal plane. The compass sensor 36 may be located anywhere in or on the rigid structure 30. The total signal received at each array element 26, including the pulses received from the transducers on the rigid structure 30 and the output of the compass sensor 36, are transmitted by a wire (not shown) to a radio transmitter 28.

Each of the several signals are transmitted (by several channels, by multiplexer or other means) to a receiving platform, for example located on an aircraft. On the aircraft the compass sensor 36 transmission is decoded so that the orientation of the rigid structure 30 is known.

Next the output of element 26 is filtered, and the time of each high frequency transmitted pulse is computed from the pulse reception time and the known length of the rigid arm 32. Alternatively, the exact time of each active transmission may be transmitted over the radio link 38.

For each of the other elements 26, the following procedure is performed: (1) the received signal at the element 26 is filtered and processed to detect a time of arrival of each pulse at the element (the pulses may be identified by a slightly different transmit frequency or by a coded pulse). Meanwhile, the low-frequency signal output of each element 26 is stored in a digital serial record in the processor on board the aircraft, for later use. The distance from each transmitting transducer 34 to the array element 26 is calculated from the transmit and receive times. The location of any other element 26 relative to the first element whose parameters were determined is calculated from the compass orientation of the rigid structure 30 and the three distances from the transmitting transducers 34 to the other element by the application of a simple mathematical algorithm which is described hereinbelow.

Thus, the position of each array element 26 relative to the first element is known. It is shown hereinbelow that the array 20 will have sufficient accuracy for tactically useful system parameters. The position finding process is repeated at each transducer ping interval; for example every five seconds. This process will be performed by a digital computer on board the receiving platform, possibly the same digital computer that is used to perform the array beamforming and signal processing.

Simultaneously with the above position-finding process, and uninterrupted by it, the digital computer will beamform and process the digitally stored array signal by conventional known methods.

Reference is now directed to FIG. 5, wherein is shown a three-dimensional sonar array 70, wherein the individual elements 26, suspended from flexible lines 24, shown in FIG. 2, are replaced by vertical 3-element line arrays 72. It will be noted that only one rigid body 80 with active transducers is required in the three-dimensional flexible sonar array 70, shown in FIG. 5, just as in the planar sonar array 20 shown in FIG. 2.

Referring now to FIG. 7, when the individual elements 126 are free floating and not tethered to each other, as in the embodiment 120, then the radio transmitter 128, (28 of FIG. 2) will be duplicated on each element of the array.

The apparatus of this invention will allow accurate beamforming to be performed with a flexible two- or three-dimensional array of arbitrary and changing shape. This method employs a rigid structure much smaller than the total array size. For example, a 600-foot diameter array needs only a 30-foot diameter rigid structure to locate all elements within ¼ wavelength at frequencies up to 300 Hz.

The prior art method of building large two- or three-dimensional arrays required that the entire array be built on a rigid structure. This rigid structure is costly, heavy, produces mechanical and flow noise, and interferes with proper beamforming by transmitting signal and noise through the structure. All of these disadvantages may be eliminated by proper application of the new method.

Other advantages are:

(1) The costly digital computer hardware that is used for element position finding is not in the array itself. The array may be built cheaply enough to be expendable. The element position finding, beamforming, and signal processing are performed by a single digital computer on the monitor platform.

(2) The active transducers on the array are covert. They operate at such high frequency that although their transmissions may be easily detected on each element at a range of a few hundred feet, they cannot be detected by an enemy at tactically useful ranges (beyond 1-2 kiloyards).

Several other alternatives are feasible: (a) The sonar array 20 described in FIG. 2 related to a two-dimensional array. A three-dimensional array 70, illustrated in FIG. 5, may be produced by two methods:

(1) Suspend vertical line arrays 72 instead of individual elements from the flexible floating member 74. Find the position of the uppermost element 76 in each line array 72 by the method described hereinabove with respect to FIG. 2.

Assume that the other elements of the line, 76M and 76B, are vertically beneath it.

(2) Provide a fourth vertical rigid member 74V perpendicular to the other three rigid members 74H. Find the position of all elements 76 of the array by a three-dimensional analog of the process described for the planar array 20 of FIG. 2. (b) It is not required that there be any mechanical connection between the array elements 76. Each element 76 might be an individual free floating buoy, with its own radio link to the monitor platform. A single buoy with the three-arm rigid body containing the active transducers could be used to find the relative positions of all of the nearby free floating elements. Thus a cluster of individual sono-buoys could be employed as a large sonar array until they drift too far apart.

(c) Suitable approximation techniques may be employed to reduce the computer capacity required for the element position finding process. The accuracy that is lost by the approximation may be gained back by frequent pinging and appropriate smoothing techniques.

APPENDIX 1

ELEMENT LOCATION ALGORITHM

Given the rigid structure 40 as shown in FIG. 3, the three transducers are labeled L, M, N.

The orientation of the structure 40 with respect to magnetic north is known, from the output of the attached magnetic sensor 36 in FIG. 2.

Reference is now directed to the structure 50 shown in FIG. 4. The distance from each transducer to a distant array element 52 is calculated from the known times of transmission and reception of each transducer signal. Let the distances from transducers L, M, N to a representative array element be l, m, n, respectively. $\phi_m$ is the angle between leg L and magnetic north. The exact range and bearing $(R,\phi)$ from the hub 62 of the rigid structure 60 may be found by a triple application of the law of cosines:

$$\alpha = \cos^{-1} \frac{J^2 + B^2 - K^2}{2BJ} \text{ where}$$

$$B = a\sqrt{3}$$

J = the smallest of the distances l, m, n
K = the second smallest of the distances l, m, n
In our example J=l, K=M $$R = (a^2 + J^2 - 2aJ\cos(\alpha + 30°))^{\frac{1}{2}}$$

$$\theta = \cos^{-1} \frac{a^2 + R^2 - J^2}{2aR},$$

where the angle is taken to be positive if K is a leg that lies clockwise from J, as in the example, negative otherwise.

$\phi = \phi_m + (I-1) 120° + \theta$ where

I = 1 if n > l and m < n

I = 2 if l > m and n < l

I = 3 if m > l and n < m

APPENDIX 2

ACCURACY AND PERFORMANCE

Consider as an example the array shown below:

| | |
|---|---|
| Array Diameter = | 600 feet |
| Rigid Body Leg Length = | 15 feet |
| Active Transducer Frequency = | 300 kHz |
| Active Transducer Bandwidth = | 30 kHz |
| Range Resolution, e = | 0.16 feet |

Reference is now directed to the configuration 90 shown in FIG. 6. With the parameters shown therein:

$$\text{Correct } \alpha = \cos^{-1} \frac{B^2 + m^2 - l^2}{2Bm}$$

$$\text{Calculated } \alpha = \cos^{-1} \frac{B^2 + m^2 - l^2 + 2\epsilon(l + m)}{2B(m + \epsilon)}$$

The maximum error occurs when l=m=300', and when the observed leg lengths are 300'+e and 300'- e. The angle error is less than 0.75°. The resultant element position error is less than 4 feet.

It will be noted that there is concern only with the error in locating distant array elements. Those that drift too close to the rigid body, within 2 leg lengths for example, will be ignored by the processing system aboard the monitor platform.

The compass in the rigid body may be subject to a large error, perhaps 5° to 10°. This error does not influence the ability to calculate the element's relative positions and form beams accurately. The result of the compass error is a 5° to 10° uncertainty in the calculated bearing to target.

As to the accuracy of the sonar array, 20 or 70, the 600 foot diameter flexible array with 15-foot rigid leg length will have an element position error of less than $\frac{1}{4}$ wavelength for all frequencies below 300 Hz.

Obviously, many modifications and variations of the present invention are possible in the light of the above teachings, and, it is therefore understood that within the scope of the disclosed inventive concept, the invention may be practiced otherwise than as specifically described.

What is claimed is:

1. An acoustic array, useful for sonar, comprising a plurality of transducing elements which are free floating and not connected to each other and a plurality of means for locating the position of each of the transducer elements, each locating means comprising:
    a means for transmitting a signal;
    three rigid arms, connected to each other and suspended from the transmitting means, the length of each arm and its orientation with respect to the other two arms being known;
    means for generating high-frequency (h-f) acoustic signals, a generating means being located at the end of each arm, the signal from each means being unique and identifiable; and
    a means for determining the magnetic orientation of the three-arm structure in space;
    signals from the h-f generating means and the magnetic determining means being transmitted to the transmitting means.

2. The acoustic array according to claim 1, wherein the array is a one-dimensional, that is, line array.

3. The array according to claim 1, wherein: the array is a two-dimensional array.

4. The array according to claim 1, wherein: the array is a three-dimensional array.

5. An acoustic array, useful for sonar, comprising:
    a plurality of transducing elements which are suspended at intervals from a free-floating, flexible body, in a manner so that they can move toward or away from each other within the limits of the length of the flexible body.

6. The acoustic array according to claim 5, further comprising:
    means for locating the position of each of the transducer elements.

7. The acoustic array according to claim 6, wherein the array is a one-dimensional, that is, line array.

8. The array according to claim 6, wherein:
    the array is a two-dimensional array.

9. The array according to claim 6, wherein:
    the array is a three-dimensional array.

* * * * *